March 9, 1954  H. F. MICHALEK  2,671,267
AIR-COOLED BLADE FOR CUTTING PLASTIC
COVERS AND THE LIKE FROM PATTERNS
Filed Sept. 15, 1951
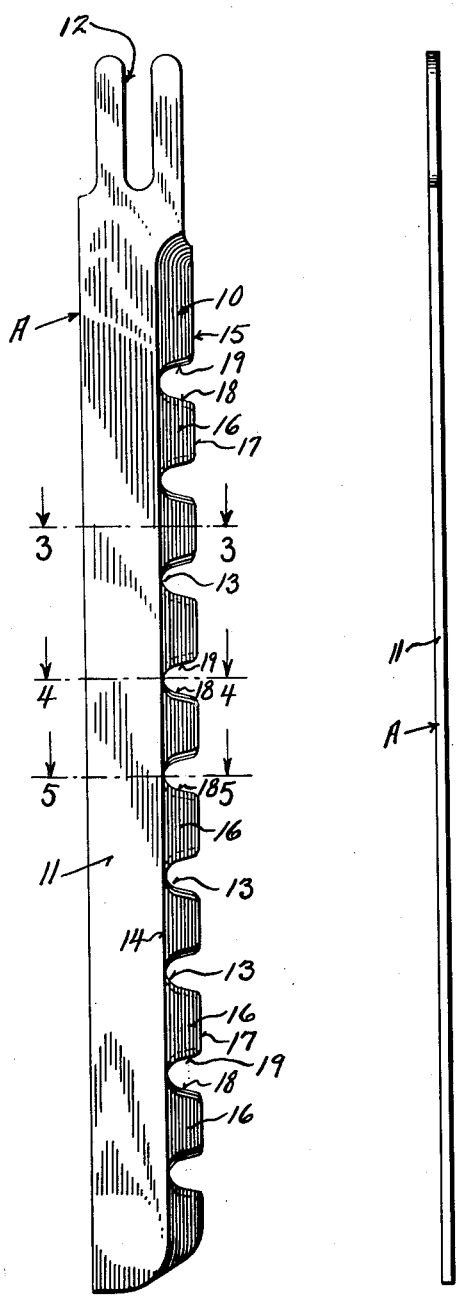
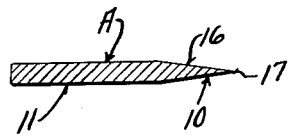
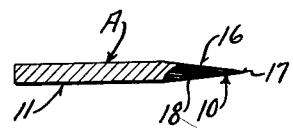
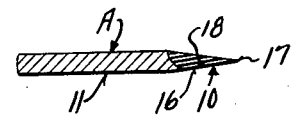
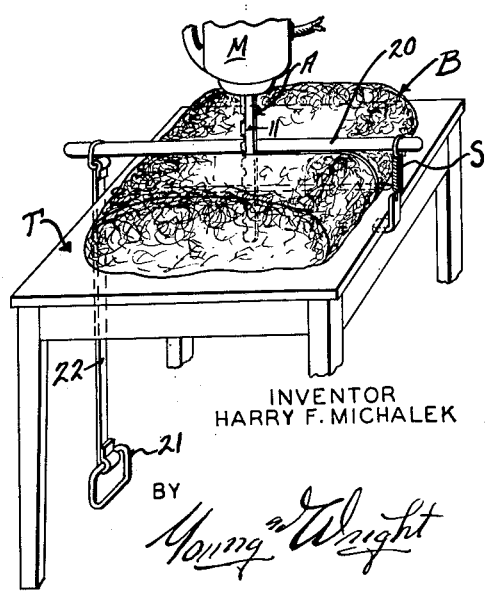
INVENTOR
HARRY F. MICHALEK
BY
ATTORNEYS Patented Mar. 9, 1954

2,671,267

UNITED STATES PATENT OFFICE 2,671,267

AIR-COOLED BLADE FOR CUTTING PLASTIC COVERS AND THE LIKE FROM PATTERNS

Harry F. Michalek, Oshkosh, Wis., assignor of one-half to Anton Michalek, Chicago, Ill.

Application September 15, 1951, Serial No. 246,794

1 Claim. (Cl. 30—355)

My invention appertains to blades and more particularly to an air-cooled blade for an electrically driven, reciprocating knife utilized primarily for cutting plastic or cloth from patterns.

In the cutting of plastics and also cloth, from patterns, the pieces to be cut are placed one upon the other with the pattern outlined. An electrically driven reciprocating knife is then guided around the pattern and the pieces are cut in accordance therewith.

Particularly in the case of cutting plastic materials for the manufacture of furniture slip covers, automotive seat covers and the like, the pieces of plastic material are generally placed one hundred high and heretofore the knife blade used for following the pattern and cutting the material has been of the straight edge type. Due primarily to the rapid reciprocation of the knife, the blade and knife become unduly heated and this tends to burn the knife and weld or fuse the plastic sheets together making it most difficult to cut on the pattern line.

To overcome the above difficulties, it has been the practice in the past to lubricate the knife and blade, usually with water. This procedure will cut down the heat but it is quite unsatisfactory in that it requires constant attention, and still is difficult to follow the pattern line. Oftentimes, it is necessary for one man to exert pressure on a tow rope attached to the motor mounting, while a second man guides the blade in the direction of cut. Serrated or sawing edges have also been tried, but it has been found that this tends to rip or tear the material rather than cut it, and also leaves, in plastics, an undue accumulation of dust or small particles, and, particularly, in cloth, ruins the pattern edges so that the sewing machine operator has an exceedingly difficult time in making a neat and attractive appearing seam. Further, in the cutting of cloth from patterns, a straight-edge knife could not be used at all, and most cloth is cut with a special round blade machine.

Therefore, one of the primary objects of my invention is to provide a novel air-cooled blade for a straight knife, which will cut plastic and cloth without the necessity of a liquid lubricant and without tearing, fusing or fraying the cut edges of the material.

Another important object of my invention is to provide a straight edge knife in which the blade is beveled from the base line at an equal angle on both sides of the knife, and formed with equally spaced wide gullets extending downwardly from the cutting edge to the base line, defining elongated teeth.

Still another object of my invention is to form each tooth with a longitudinally extending cutting edge parallel to the base line of the blade with the two side edges of the tooth having a fleam or bevel, providing a tooth of trapezoidal shape with three of its sides being cutting edges.

A salient feature of my invention lies in the fact that the two transverse side edges of one tooth are fleamed or beveled to a sharp cutting edge from the same side of the blade while the two side edges of the next adjacent tooth are similarly beveled but from the opposite side of the blade, each adjacent tooth alternating in a like manner, whereby the blade will not only present edges for both an up or down cutting movement, but the alternate side bevel of each edge will tend to stabilize the blade and aid it in cutting on the line.

A further object of my invention is to provide an air-cooled straight edge knife of the above character to effectively cut materials which in the past could not be cut with a straight edge reciprocating knife.

A still further object of my invention is to provide a simple, practical and reliable construction that is economical to manufacture, easy to assemble and positive in its operation. With the above and other objects in view, which will more readily appear as the nature of my invention is better understood, the same consists in the novel construction, combination and arrangement of parts hereinafter more fully described, illustrated and claimed.

A preferred and practical embodiment of my invention is shown in the accompanying drawings, in which:

Figure 1 is a side elevational view of my knife and showing a blade constructed in accordance with the present invention;

Figure 2 is a rear elevational view of my knife illustrating the uniform thickness of the knife from the rear to the base line;

Figure 3 is a transverse section through my knife and blade, the section being taken on the line 3—3 of Figure 1 and looking in the direction of the arrows;

Figure 4 is a transverse sectional view through my knife illustrating in particular the bevel or fleam of one of the teeth, the section being taken on the line 4—4 of Figure 1 and looking in the direction of the arrows;

Figure 5 is a transverse sectional view similar to Figure 4, but illustrating the fleam or bevel of the next adjacent tooth, the section being taken on the line 5—5 of Figure 1, and looking in the direction of the arrows;

Figure 6 is a fragmentary perspective view illustrating one use of my novel knife, and showing it attached to its motor casing.

Referring to the drawings in detail, wherein similar reference characters designate corresponding parts throughout the several views, the letter A generally indicates a knife of the straight edge type, the blade 10 of which is constructed in accordance with the teachings of my present invention. The knife A includes generally the blade 10, body 11 and a slotted rear portion 12 which is adapted to be received in a clamping device of a motor M.

Referring in particular to Figure 1 of the drawings, it can be seen that I provide a series of equally spaced gullets 13 of a generally arcuate shape at the base line 14. The blade 10, in its broad aspect, extends from the base line 14 and terminates in a sharpened cutting edge 15. As clearly shown, the cutting edge 15 is formed by beveling or sharpening on an equal angle from both sides of the knife from the base line upwardly, and the gullets 13 extend from the cutting edge 15 downwardly to the base line 14 as shown.

The spaced gullets define upstanding teeth 16, each tooth having an elongated cutting edge 17 forming part of the longitudinally extending cutting edge 15. The two transversely extending edges of each tooth 16 are also fleamed or beveled to form sharp cutting edges 18 and 19. The two side cutting edges 18 and 19 of one tooth are keenly sharpened or beveled at the same angle from the same side of the blade, while the two edges 18 and 19 of the next adjacent tooth are beveled at a similar angle but from the opposite side of the blade. This is illustrated quite clearly in Figures 4 and 5 of the drawing in which similar sections are taken through the knife, illustrating the cutting edges 18 of adjacent teeth.

The cutting edge 18 of each tooth is utilized for cutting as the knife is reciprocated upwardly. The cutting edge 19 of each tooth will cut as the knife is reciprocated downwardly, and it is important to note that as the alternate side cutting edges 18, 18 or 19, 19 are beveled from opposite sides of the blade. It is primarily due to the above feature that the knife and blade will be stabilized to cut in a straight line enabling the knife to be easily guided about the pattern.

The space between the opposed cutting edges 18, 19 which is provided by the deep gullet 13 forms an air pocket, and during the rapid reciprocation of the knife 11 and blade 10 the air will be rapidly moved about the gullets 13 and cutting edges of the blade to cool the same, thus preventing the knife or blade from burning. This is particularly advantageous in the case of cutting plastic material as it will eliminate the fusing of the cut edges without the necessity of using a liquid lubricant.

Attention should also be directed to the fact that in the preferred embodiment of my invention the transverse cutting edge 19 of one tooth and the opposed cutting edge 18 of the next adjacent tooth extend downwardly at an obtuse angle from the longitudinal cutting edge 17 to meet at the base line 14 in a slight arc. The cutting edges 17, 18 and 19 are actually continuations and integral portions of the main centrally disposed cutting edge 15.

For example, the cutting edge 17 of one tooth lies in the same longitudinal plane and extends longitudinally along the center of the knife with the cutting edge 17 of the next adjacent tooth. The cutting edge 18 of one tooth continues downwardly from the respective cutting edge 17 on one side of the blade, crosses over at the base line 14 to extend upwardly from the opposite side of the blade toward the next adjacent cutting edge 17 to form the opposed cutting edge 19.

While the knife and blade were primarily designed for cutting plastic seat covers, slip covers, etc., from patterns, I have found that the knife is also useful in a number of other arts in which a straight edge knife could not heretofore be used. For example, in Figure 6 of the drawings, I have illustrated the knife 11 secured to its motor M and cutting a bale of cotton batting B. Previous to my invention, cotton bales could not be cut and were usually torn manually in 20" x 20" pieces, and it usually took a whole day for one man to tear three bales. By utilizing my knife in the manner illustrated in Figure 6 of the drawing, it is possible to cut the bales of cotton with ease.

In accordance with the illustrated method, I place the cotton bale B upon a table T to which is resiliently clamped by means of a spring S one end of a rod or pole 20. The pole 20 extends across the bale B and has attached to its opposite end a foot stirrup 21 and flexible strap 22, as shown. The operator merely places his foot in the stirrup 21 and applies the desired pressure to the pole or rod 20 to hold the bale B to the table T. The knife 11 is then placed in the position shown and the cotton cut as desired. Not only do the gullets 13 provide a means for air to circulate about the blade and knife, but they also provide the necessary side cutting edges to cooperate with the longitudinal cutting edge.

In addition to cutting cotton, cloth and plastic, I have found that it works equally as well in cutting paper for wrapping purposes, foam rubber, etc.

From the foregoing, it is believed that the features and advantages of the invention will be readily apparent to those skilled in the art, and it will, of course be understood that changes in the form, proportion and minor details of construction may be resorted to without departing from the spirit of the invention or the scope of the appended claim.

I claim:

A knife of the type to be secured to a motor mounting and rapidly reciprocated comprising an elongated body having a longitudinally extending blade, said blade including two parallel side faces and two beveled faces, the intersection of said parallel side faces with said beveled faces defining a base line, each beveled face forming an equal angle at the base line with a respective parallel side face, said beveled faces intersecting to form a keen, centrally disposed cutting edge, and a series of equally spaced elongated blade teeth defining wide spaced gullets extending downwardly between two adjacent teeth from the centrally disposed cutting edge and terminating at the base line, the gullet edges of one tooth being beveled from one side only to form keen transversely extending cutting edges, and the gullet edges of the adjacent teeth being beveled from the opposite side only with each adjacent tooth being alternately beveled, said centrally disposed cutting edge co-inciding with the cutting edges of the elongated blade teeth and forming one continuous cutting edge with the beveled side edges of the teeth.

HARRY F. MICHALEK.

References Cited in the file of this patent

UNITED STATES PATENTS

| Number | Name | Date |
| --- | --- | --- |
| 1,227,234 | Bacon | May 22, 1917 |
| 1,246,905 | Garlock et al. | Nov. 20, 1917 |